United States Patent [19]

Lieberman

[11] 4,171,738

[45] Oct. 23, 1979

[54] CONVEYOR MECHANISM FOR CONVEYING FLEXIBLE POUCHES ADAPTED TO CONTAIN FLUIDS, GRANULAR SUBSTANCES AND THE LIKE

[75] Inventor: Abraham B. Lieberman, Montreal, Canada

[73] Assignee: Glopak Industries Limited, St. Leonard, Canada

[21] Appl. No.: 826,260

[22] Filed: Aug. 19, 1977

[51] Int. Cl.$^2$ .............................................. B65G 47/86
[52] U.S. Cl. .................................... 198/479; 198/654; 198/694; 226/173
[58] Field of Search ...................... 198/65 J, 822, 694, 198/476, 479, 654; 226/170, 171, 172, 173

[56] References Cited

U.S. PATENT DOCUMENTS

| 559,370 | 5/1896 | Dodge | 198/822 |
| 3,351,034 | 11/1967 | Grek | 226/173 X |

FOREIGN PATENT DOCUMENTS 922657 4/1963 United Kingdom ..................... 198/694

*Primary Examiner*—Robert B. Reeves
*Assistant Examiner*—Douglas D. Watts
*Attorney, Agent, or Firm*—Browdy and Neimark

[57] ABSTRACT

The herein described conveyor mechanism for conveying flexible pouches adapted to contain fluids, granular substances and the like, consisting of a conveyor mechanism for individually engaging, supporting and holding flexible pouches in an approximately fixed position on a conveyor belt which is formed of a series of independent fingers which are laterally and individually secured to a sprocket-driven endless roller bearing link-chain and located adjacent to one another and having their upper and lower portions shaped to automatically engage, support and hold the sides and bottom of the flexible pouches, while being transported, at approximately any angle from zero to 90°, between given points, and when reaching the top of the climb, the pouches are automatically released in succession by the fingers, thereby causing them to drop in an approximately straight downward direction for bagging or other disposal of the pouches.

5 Claims, 9 Drawing Figures

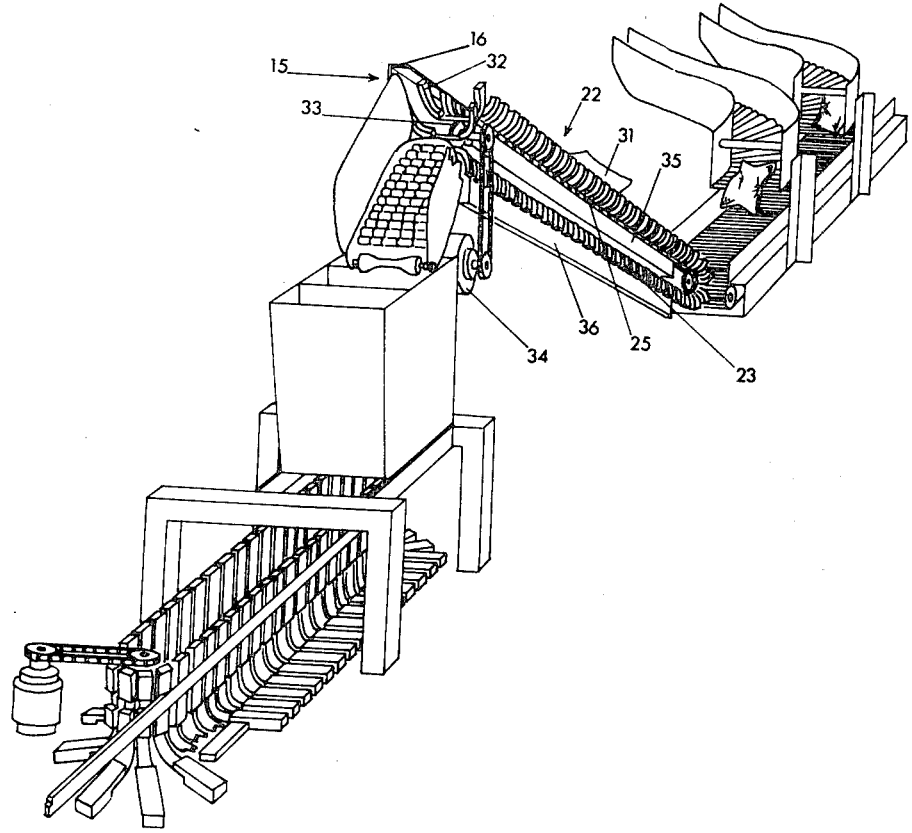

CONVEYOR MECHANISM FOR CONVEYING FLEXIBLE POUCHES ADAPTED TO CONTAIN FLUIDS, GRANULAR SUBSTANCES AND THE LIKE

The invention relates to improvements in a conveyor mechanism for conveying flexible pouches adapted to contain fluids, granular substances and the like, as described in the present specification and illustrated in the accompanying drawings that form a part of the same.

The invention consists essentially of the novel features of construction as pointed out broadly and specifically in the claims for novelty following a description containing an explanation in detail of an acceptable form of the invention and a modification thereof.

In the following description and accompanying drawings, the conveyor mechanism is described as being utilized in a milk dairy and is so positioned as to receive the sealed pouches from a pouch filling machine (not shown) and delivering them to a pouch bagging machine and then forwarding the filled bags, received from the milk pouch bagger, to a station for tying or sealing the open ends of the bag (not shown), shipping or for other disposition, but it will of course be understood that, with or without modifications, the conveyor mechanism may be used for carrying various other types of commodities in places where they are made or distributed, such as in refineries, breweries, food producers, distributors, warehouses and other locations.

In the following description and in the claims, various details will be identified by specific names for convenience; the names, however, are intended to be generic in their application.

It is conventional in the industry to utilize ordinary conveyors which are formed of endless flat or roller type of conveyor traction belts which transport the pouches from one place to another and will carry them satisfactorily when there is only a very gradual rise, but when there is a quick rise, they tend to slip and run out of time.

This is particularly evident when such conveyors are used for carrying milk pouches from milk pouch filling machines to pouch bagging machines and which are generally situated at different levels. In such cases, it is necessary to install a long, extended, slowly-rising conveyor to raise the pouches high enough to fall into the bagging machine, thereby not only taking unnecessary valuable space but at any time actually disrupting the cycle time between the synchronization of the pouch filling machine and the pouch bagging machine. In other instances, a pair of power-driven opposing endless flat belts, sufficiently spaced apart, have been used for receiving and engaging milk pouches and frictionally engaging the opposing sides thereof for raising the pouches from the pouch filling machine to the pouch bagging machine.

In all instances, these conveyors usually become wet, because of the sanitary conditions that are required, with the consequent slippage of position of the pouches being carried by such conveyors, which often occurs, resulting in effecting a further mistiming of the cycle time in the synchronization of the machine and the conveyor mechanism. Furthermore, when the rising conveyor brings the pouches into the head of the pouch bagging machines, they sometimes arrive one sliding onto the one behind it and they enter the pouch bagging machine two at a time. When this happens, a big jam-up appears, resulting in waste milk and loss of time, as well as the necessity of stopping the operation of the pouch filling machine, pouch bagging machine and the conveyor mechanism, washing up the machine or machines and generally cleaning up the mess, before the operation of the machines and conveyor mechanism may be restarted.

It is therefore the purpose of this invention to avoid such defects and other shortcomings of the conveyor, such as hereinbefore described, and devise a conveyor mechanism that is particularly utilized for supporting, carrying and elevating flexible pouches and the like, usually made of synthetic resinous material such as thermoplastic, polyethylene, polypropylene or other equivalents, which contain fluids, granular and other similar substances. This conveyor mechanism is capable of automatically engaging with the flexible pouches and to raise or lower the pouches at any angle from zero to approximately 90° and to maintain the pouches at approximately the same location thereon that they had upon being engaged by the moving conveyor at the receiving end thereof until the pouches reach the discharge end of the conveyor, where they are automatically released.

Among other objects of the invention is to devise an endless conveyor formed of means for engaging, supporting and holding each of the flexible pouches lengthwise in an approximately fixed position thereon and in regular succession drawing the pouches upwardly and, when reaching the top, the pouches are automatically released and immediately directed in a straight downward direction into a pouch bagging machine or other receptacle.

Another object of the invention is in having the additional advantage that when the pouch reaches the top of the conveyor, instead of being thrown forward, because of its frictional contact with the sides of the conveyor, each pouch, at any speed, is immediately released and automatically changes its angle from an off-horizontal slanting position into an approximate vertical position as it is directed in a straight downward direction into the pouch bagger or in containers and other disposal means.

Still another object of the invention is that it has a further advantage over prior milk pouch conveyors in that its conveyor usually becomes wet because of the sanitary conditions that are required, and its pouches supported thereon will be less likely to slip when they are wet, than pouches being carried by flat or other types of conveyors that would produce any synchronizing ability.

A further object of the invention is to provide a conveyor mechanism which is adaptable for continuous and reliable operation at high speeds and will establish firm frictional drive and traction between each product unit and the conveying means.

Still another object of the invention is to devise a means whereby the pouches follow the conveyor instead of leaving the conveyor when the direction of the conveyor changes.

A further object of the invention is in having the advantage over the prior milk pouch conveyors in that, when the flexible pouch leaves the milk filling machine, it drops onto a flat belt which carries it into the mouth of the hereinafter described angular conveyor, and when it reaches the mouth, the foremost holding means of the conveyor gently engage the front edges and sides of the pouch into the conveyor as they both travel and, upon entering, the contour of the pouch is snugly fitted into the conveyor.

Other and further objects, advantages and improvements of the invention will be readily understood and appreciated from the description of the invention in its operation as set forth in the specification below when read in connection with the drawings, in illustrating various embodiments of the invention.

IN THE DRAWINGS

FIG. 1 is a perspective view illustrating the conveyor mechanism as utilized in a dairy system for receiving the sealed milk pouches from a pouch form-filling and sealing machine and delivering them to a pouch bagger, and having one side of its casing removed to illustrate the mechanism.

FIG. 2 is an enlarged fragmentary perspective view of the pouch discharge end portion of the conveyor and showing the pouch holding and supporting means in the shape of individual units having pouch holding and supporting fingers and secured to an endless roller bearing link-chain to complete the endless conveyor belt, and showing the pouches being automatically released by the fingers from their holding and supporting positions on the conveyor belt in an approximately straight downward direction.

Figure 1:
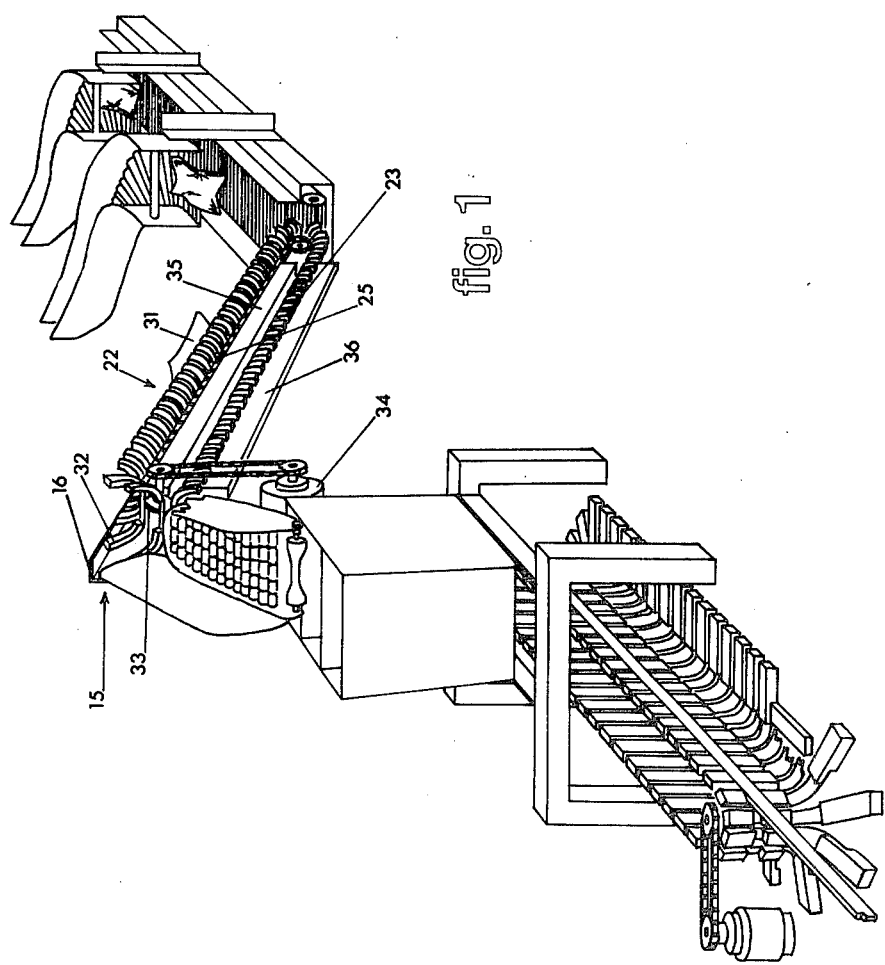
Figure 2:
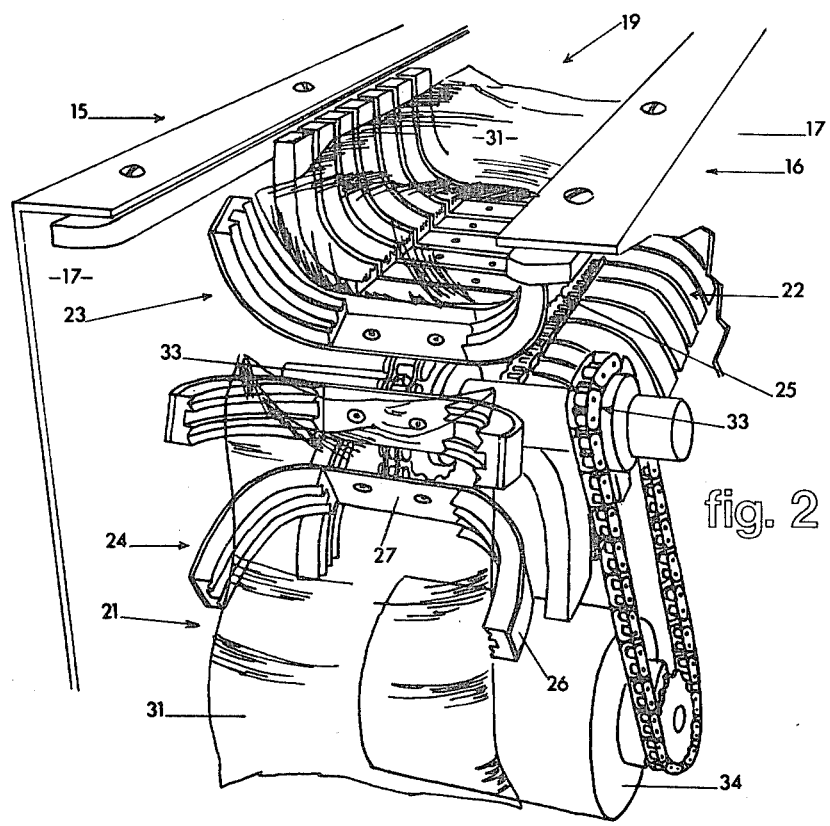
Figure 3:
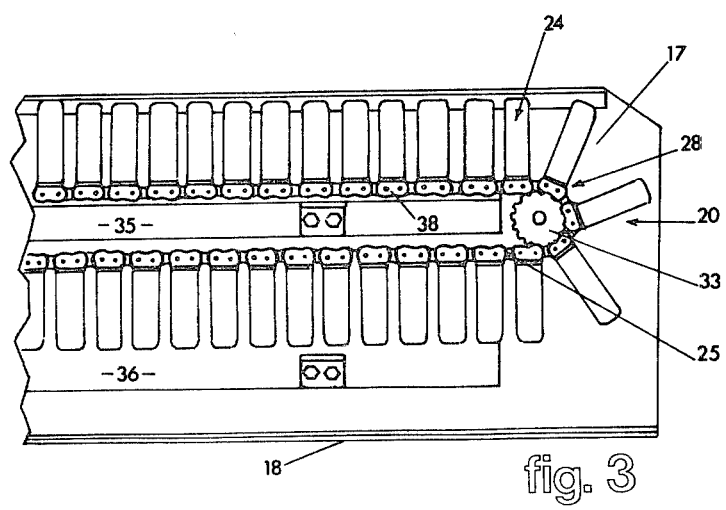
FIG. 3 is an enlarged fragmentary side view of the pouch receiving end portion of the conveyor, having one of its side walls removed.
Figure 4:
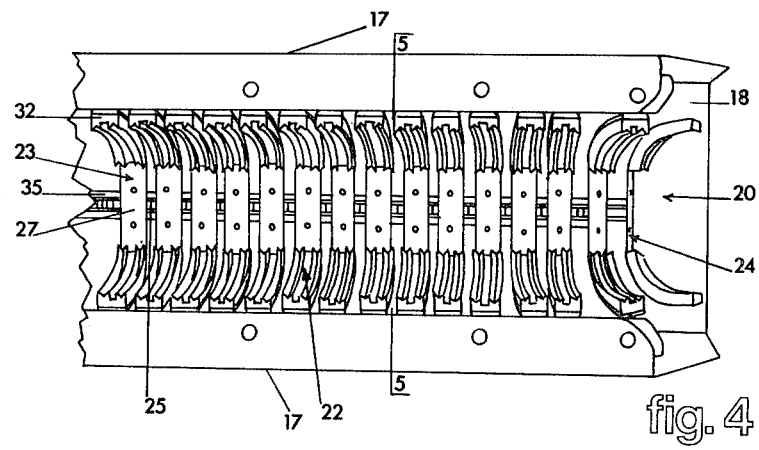
FIG. 4 is an enlarged fragmentary plan view of the pouch receiving end portion of the conveyor.
Figure 5:
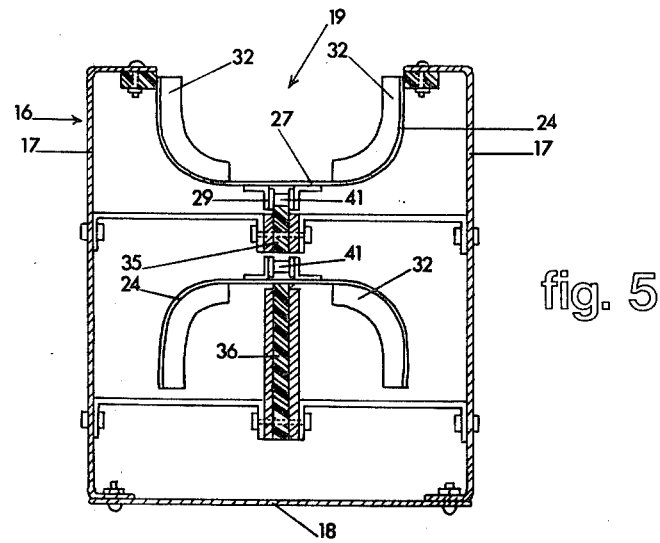
FIG. 5 is a cross-sectional view as taken along the line 5—5 in FIG. 4.
Figure 6:
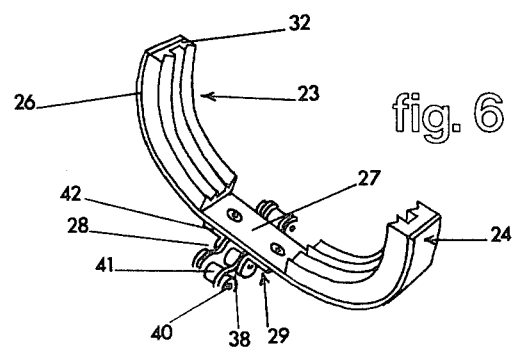
FIG. 6 is an enlarged perspective detail of one of the arcuate fingers or strips as secured to a chain link.
Figure 7:
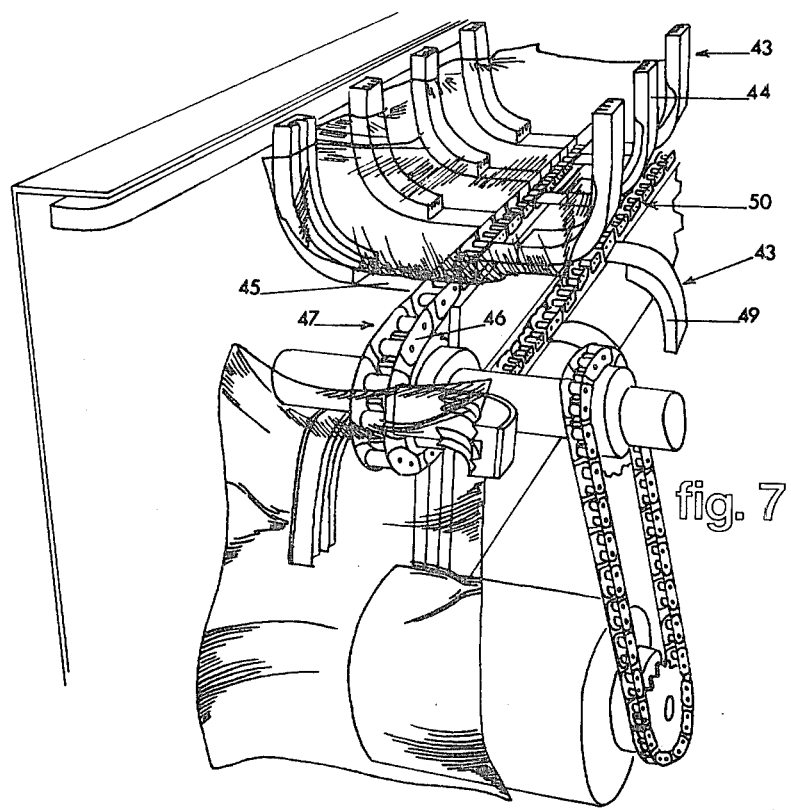

FIG. 7 is a modification of the conveyor mechanism illustrating a perspective fragmentary view of the pouch discharge end portion of the conveyor, showing the holding fingers attached to a sprocket-driven roller bearing endless link-chain in a staggered formation and forming therewith the conveyor belt; the holding fingers are adapted to individually engage the sides and underside of the pouch in cooperation with the roller bearing endless link-chain for setting the pouch in the center of the moving conveyor belt and holding the pouch in a zigzag fashion for locking it to the conveyor belt.

Figure 8:
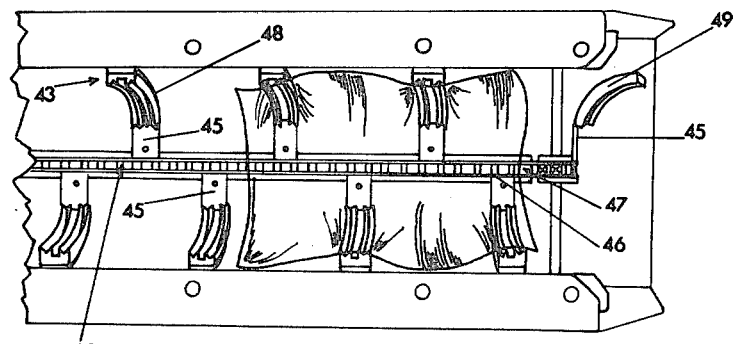

FIG. 8 is a fragmentary plan view of the conveyor mechanism as illustrated in FIG. 7, and illustrating the manner in which the flexible pouches are supported and held on the conveyor.

Figure 9:
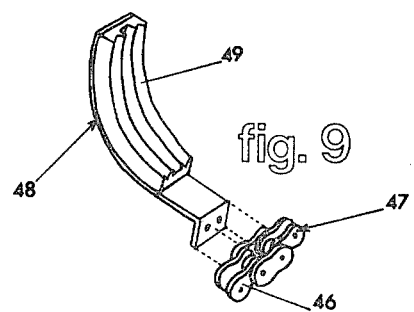

FIG. 9 is a perspective detail of one of the holding fingers as shown in FIG. 7.

Like numerals of reference indicate corresponding parts in the various figures.

Referring to the drawings, a preferred embodiment of the invention as illustrated in FIGS. 1 to 6, is shown of the conveyor mechanism as forming a part of the milk pouch packaging system in a milk dairy, in which the conveyor mechanism, as indicated by the numeral 15, consists of a longitudinal casing 16 formed of the side walls 17, a bottom closure wall 18, an open top 19, an open pouch receiving end 20, and an open discharge end 21. The endless conveyor belt 22 is formed of a series of independent pouch-engaging and holding units 23, consisting of fingers 24, and are individually secured to a sprocket-driven roller bearing endless link-chain 25 and extend crosswise thereon and are located adjacent to one another. The endless conveyor belt 22, which is formed by the endless sprocket-driven roller bearing link-chain and the independent pouch-engaging and holding units 23, is supported and secured within the casing 16.

Each of the fingers is preferably made from rigid or semi-rigid material, such as plastics, resilient material, metal, composite and other equivalent materials and is formed of a flat, arcuate-shaped strip 26 that straddles the roller bearing endless link-chain 25 and has its central portion 27 secured to the link 28 of the link-chain by means of brackets 29 or other suitable fastening means. The arcuate end portions 30 of the finger 24 extend outwardly from the flat central portion 27 of the finger in an inward curve to form a contour for a better holding engagement with the contour of the side portions of the flexible bag 31, especially when it contains liquid contents. The inner surface of the contour portions of the finger may be provided with suitable anti-skidding members 32 made from rubber and other materials or integrally grooved for aiding in retarding possible slippage of the pouch from its positioned location on the conveyor.

Each finger 24 has a lateral motional sway from a fixed position on a chain-link in relation to the longitudinal directional movement of the sprocket-driven endless roller bearing link-chain and coordinates with the adjacent fingers for engaging with the side portions of the flexible bag as it is fed onto the conveyor belt mechanism.

The receiving end of the conveyor mechanism has the oncoming fingers of the conveyor belt 22 instantly grasp the front end of the pouch and which is immediately followed up by the continuous endless series of fingers which, together with the endless roller bearing link-chain, actually form the conveyor belt, until the whole side portions of the pouch are engaged and interlocked by the fingers with the belt and fixedly held thereon in approximately one fixed location until it is automatically released at its discharge point.

The fingers are actually contracting with one another from their expanded positions for interlocking the pouch to the conveyor belt, while at the outlet or discharge point for releasing the pouch, the fingers automatically spread apart from one another and release themselves from the pouch as they drop away from one another on their "return run", and the pouch drops away in a downward direction from the conveyor belt in an approximately upright position into a pouch bagging machine or other disposition thereof.

The sprocket-driven endless roller bearing link-chain is driven by sprockets 33 suitably operated by a power unit 34 and is in rolling contact with the upper longitudinal fixed rail 35, which is suitably secured within the casing 16, and is supported on its "return run" by the lower longitudinal rail 36 secured within the casing 16.

Each of the roller bearing links 37 of the link-chain is formed of outer link bars 38 terminating in journal ends 39 and joined together by transverse shafts 40, on which the roller bearings 41 are journaled. The outer link bars 38 are provided with integral lugs 42 and the link 37 is secured thereby to the underside of the pouch-engaging and holding unit 23.

The conveyor mechanism is particularly devised for individually engaging, supporting and holding flexible pouches in an approximately fixed position on a conveyor belt which is formed of a series of independent fingers which are laterally and individually secured to a sprocket-driven endless link-chain and located adjacent to one another and having their upper portions shaped to automatically engage and hold the sides of the flexible pouches, while being transported, at approximately any angle from zero to 90°, between given points, and when reaching the top of the climb, the pouches are automatically released in succession by the fingers and thereby causing them to drop in an approximately straight downward direction for bagging or other disposal of the pouches.

A modification of the invention, as illustrated in FIGS. 7, 8 and 9, discloses a conveyor mechanism somewhat similar to the acceptable form of the invention as hereinbefore described and illustrated, with the exception of the structure and arrangement of the independent pouch-engaging and supporting units, which in this modification consist of a series of individual units 43, each unit being formed of a single arcuate-shaped finger 44, having its inner end portion 45 extending inwardly for securement to a link 46 of the roller bearing endless link-chain 47 and its outer arcuate-shaped end portion 48, which may be provided with a pouch anti-skidding member 49 or simply with a corrugated surface. The arcuate-shaped portion of the finger is adapted to engage with one side of the contour portion of the flexible pouch while its inner end portion 45 is adapted to engage with the underside of the flexible pouch.

These holding fingers 44 are attached alternately to each side of the sprocket-driven roller bearing endless link-chain 47 in a staggered formation and forming therewith the conveyor belt 50. These holding fingers are adapted to individually engage the sides and bottom of the flexible pouch for setting the pouch in the center of the moving conveyor belt and holding the pouch in a zigzag fashion for locking it to the conveyor belt.

In this way, the conveyor automatically takes the pouches to itself and thereby synchronizing one pouch behind the other and thereby avoiding the necessity of running a long, extended, slowly-rising conveyor to raise the pouches high enough to fall into the bagging machine. In this invention, the conveyor will draw the flexible bags up almost in a vertical degree if it is necessary and still maintain the pouch in its synchronous position.

It will, of course, be understood that various changes may be made in the form, details, arrangements and proportions of the various parts without departing from the scope of the invention.

What I claim is:

1. In a conveyor mechanism for conveying flexible pouches adapted to contain fluids, granular materials and the like, a casing having open ends for receiving and discharging the pouches, upper and lower longitudinal and parallel fixed rails secured in said casing, an endless conveyor belt formed of a sprocket-driven endless roller bearing link-chain mounted and secured in said casing in supporting contact with said upper and lower longitudinal fixed rails, a series of pouch-engaging and holding units in the form of laterally extending fingers individually and alternately secured to each side of said sprocket-driven endless roller bearing link-chain and located adjacent to one another in sequence, and whereby, in operation, said pouch-engaging and holding fingers are adapted to individually and collectively engage the sides and bottom of the flexible pouch for setting the pouch in the center of the moving conveyor belt and holding the pouch in a zigzag fashion for locking it to the conveyor belt.

2. In a conveyor mechanism for conveying flexible pouches adapted to contain fluids, granular materials and the like, a casing having open ends for receiving and discharging the pouches, upper and lower longitudinal and parallel fixed rails secured in said casing, and endless conveyor belt formed of a sprocket-driven endless roller bearing link-chain mounted and secured in said casing in supporting contact with said upper and lower longitudinal fixed rails, a series of pouch-engaging and holding units individually and alternately secured to each side of said sprocket-driven endless roller bearing link-chain and located adjacent to one another in sequence, each said pouch-engaging and holding unit being formed of a single arcuate-shaped finger having its inner end portion extending inwardly for securement to a link of the sprocket-driven endless roller bearing link-chain and adapted to engage with the underside of a respective flexible pouch, and its outer arcuate-shaped end portion being adapted to engage with one side of the contour portion of this flexible pouch, and whereby, in operation, said pouch-engaging and holding units are adapted to individually and collectively engage the sides and bottom of the flexible pouch for setting the pouch in the center of the moving conveyor belt and holding the pouch in a zigzag fashion for locking it to the conveyor belt.

3. In a conveyor mechanism as claimed in claim 2, in which the engaging, supporting and holding fingers are each separately and independently secured to individual links of said sprocket-driven endless roller bearing link-chain and arranged in independent endless rows on each side thereof.

4. In a conveyor mechanism as claimed in claim 3, in which the engaging, supporting and holding fingers that are independently secured to each side of said sprocket-driven endless roller bearing link-chain are so arranged that the fingers secured to one side of the sprocket-driven endless roller bearing link-chain are located in offset position to the fingers independently secured to the opposite side thereof.

5. In a conveyor mechanism as claimed in claim 3, in which a flexible anti-skidding member is flexed to conform to the shape of the curvature portion of the engaging, supporting and holding finger and secured to the inner surface thereof.

* * * * *